US006759118B2

(12) United States Patent
Finn et al.

(10) Patent No.: US 6,759,118 B2
(45) Date of Patent: Jul. 6, 2004

(54) ELECTROPHOTOGRAPHIC SYSTEM WITH MEMBER FORMED FROM BORON NITRIDE FILLER COUPLED TO A SILANE

(75) Inventors: Patrick J. Finn, Webster, NY (US); Dennis M. Dudek, Sherwood, OR (US)

(73) Assignee: Xerox Corporation, Stamford, CT (US)

(*) Notice: Subject to any disclaimer, the term of this patent is extended or adjusted under 35 U.S.C. 154(b) by 101 days.

(21) Appl. No.: 10/078,089

(22) Filed: Feb. 19, 2002

(65) Prior Publication Data

US 2003/0156867 A1 Aug. 21, 2003

(51) Int. Cl.[7] .......................... B32B 25/02; G03G 15/20

(52) U.S. Cl. ....................... 428/323; 428/421; 428/906; 399/333

(58) Field of Search ................................ 399/302, 307, 399/308, 330, 333; 219/216, 469; 492/56; 428/36.8, 36.91, 532, 323, 421, 906

(56) References Cited

U.S. PATENT DOCUMENTS

| | | | | |
|---|---|---|---|---|
| 3,050,490 | A | 8/1962 | Nitzsche et al. | 524/404 |
| 4,264,181 | A | 4/1981 | Lentz et al. | 399/324 |
| 4,292,225 | A | 9/1981 | Theodore et al. | 524/268 |
| 4,763,158 | A | 8/1988 | Schlueter, Jr. et al. | 399/324 |
| 5,017,432 | A | 5/1991 | Eddy et al. | 428/422 |
| 5,729,813 | A | 3/1998 | Eddy et al. | 399/333 |
| 5,935,712 | A | 8/1999 | Tan et al. | 428/421 |
| 5,998,033 | A | 12/1999 | Tan et al. | 428/422 |
| 6,096,429 | A | 8/2000 | Chen et al. | 428/421 |
| 6,114,041 | A | 9/2000 | Tan et al. | 428/421 |
| 6,218,014 | B1 | 4/2001 | Pickering et al. | 428/421 |

OTHER PUBLICATIONS

MatWeb Material Propery Data Sheet, DuPont Dow Elastomers Viton® GF Fluoroelastomer, Jan. 1996.*

* cited by examiner

*Primary Examiner*—Ramsey Zacharia
(74) *Attorney, Agent, or Firm*—Nixon Peabody LLP

(57) ABSTRACT

The present invention relates to an electrophotographic system, having a member which includes a surface layer and also may include a base layer. The surface layer is prepared from a surface layer composition which includes a fluoroelastomer and a boron nitride filler coupled with a silane.

2 Claims, 1 Drawing Sheet

ELECTROPHOTOGRAPHIC SYSTEM WITH MEMBER FORMED FROM BORON NITRIDE FILLER COUPLED TO A SILANE

FIELD OF THE INVENTION

The present invention relates to an electrophotographic system, which has a member with a surface layer and also may include a base layer. The surface layer is prepared from a surface layer composition, which includes a fluoroelastomer, and a boron nitride filler coupled with a silane.

BACKGROUND OF THE INVENTION

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be the photosensitive member itself or other support sheet such as plain paper.

The use of thermal energy for fixing toner images onto a support member is well known. In order to fuse electroscopic toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, the thermoplastic resin particles are fused to the substrate by heating to a temperature of between about 75° C. to about 160° C. or higher depending upon the softening range of the particular resin used in the toner. It is undesirable, however, to raise the temperature of the substrate substantially higher than about 200° C. because of the tendency of the substrate to discolor at such at elevated temperatures particularly when the substrate is paper.

Several approaches to thermal fusing of electroscopic toner images have been described in the prior art. These methods include providing the application of heat and pressure substantially concurrently by various means: a roll pair maintained in pressure contact; a belt member in pressure contact with a roll, and the like. Heat may be applied by heating one or both of the rolls, plate members or belt members. The fusing of the toner particles takes place when the proper combination of heat, pressure, and contact time are provided. The balancing of these parameters to bring about the fusing of the toner particles is well known in the art, and they can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip effects the fusing of the toner image onto the support. It is important in the fusing process that no offset of the toner particles from the support to the fuser member takes place during normal operations. Toner particles offset onto the fuser member may subsequently transfer to other parts of the machine or onto the support in subsequent copying cycles, thus increasing the background or interfering with the material being copied there. The so called "hot offset" occurs when a splitting of the molten toner takes place during the fusing operation with a portion remaining on the fuser member. The hot offset temperature or degradation of the hot offset temperature is a measure of the release property of the fuser roll, and accordingly it is desired to provide a fusing surface which has a low surface energy to provide the necessary release. To insure and maintain good release properties of the fuser roll, it has become customary to apply release agents to the fuser members to insure that the toner is completely released from the fuser roll during the fusing operation. Typically, these materials are applied as thin films of, for example, silicone oils to prevent toner offset.

Some recent developments in fuser members, release agents and fusing systems are described in U.S. Pat. Nos. 4,257,699 and 4,264,181 to Lentz and U.S. Pat. No. 4,272,179 to Seanor. These patents describe fuser members and methods of fusing thermoplastic resin toner images to a substrate where a polymeric release agent having functional groups is applied to the surface of the fuser member. The fuser member comprises a base member having an elastomeric surface with a metal containing filler therein which has been cured with a nucleophilic addition curing agent. Examples of such a fuser member is an aluminum base member with a poly(vinylidenefluoride-hexafluoropropylene) copolymer cured with bisphenol curing agent having lead oxide filler dispersed therein and utilizing a mercapto functional polyorganosiloxane oil as a release agent. In those fusing processes, the polymeric release agents have functional groups (also designated as chemically reactive functional groups) which interact with the metal containing filler dispersed in the elastomer or resinous material of the fuser member surface to form a thermally stable film which releases thermoplastic resin toner and which prevents the thermoplastic resin toner from contacting the elastomer material itself. The metal oxide, metal salt, metal alloy, or other suitable metal compound filler dispersed in the elastomer or resin upon the fuser member surface or the elastomer or resin therein interacts with the functional groups of the polymeric release agent. Preferably, the metal containing filler materials do not cause degradation of or have any adverse effect upon the polymeric release agent having functional groups. Because of this reaction between the elastomer having a metal containing filler and the polymeric release agent having functional groups, excellent release and the production of high quality copies are obtained even at high rates of speed of electrostatographic reproducing machines.

In electrophotographic fuser systems, fuser roller overcoats are made with layers of polydimethylsiloxane ("PDMS") elastomers, fluorocarbon resins, and fluorocarbon elastomers. PDMS elastomers have low surface energy and relatively low mechanical strength, but is adequately flexible and elastic and can produce high quality fused images. After a period of use, however, the self-release property of the roller degrades and offset begins to occur. Application of a PDMS oil during use enhances the release property of the fuser roller surface but shortens roller life due to oil swelling. Fluorocarbon resins like polytetrafluoroethylene ("PTFE") have good release properties but less flexibility and elasticity than PDMS elastomers. Fluorocarbon elastomers, such as Viton™ and Fluorel™, are tough, flexible, resistant to high temperatures, durable and do not swell, but they have relatively high surface energy and poor thermal conductivity.

Particulate inorganic fillers have been added to fluorocarbon elastomers and silicone elastomers to increase mechanical strength and thermal conductivity. High thermal conductivity is an advantage because heat needs to be efficiently and quickly transmitted to the toner from the outer surface of the fuser roller to fuse the toners and yield the desired toner images. However, incorporation of inorganic materials to improve thermal conductivity has a major drawback: it increases the surface energy of fuser roller surface and also increases the interaction of the filler with the toner and receiver. After a period of use, the toner release properties of the roller degrade and toner offset begins to occur due to roller wear and weak interaction between the filler and the polymer matrix. It would be desirable to provide a fuser member having a fluorocarbon elastomer overcoat layer containing thermally conductive inorganic fillers, but which still has good toner release property. In addition, the outer surface of the fuser member should be compatible with the functionalized polymeric release agent employed during the fixing process.

Fuser members of fluorocarbon elastomer containing inorganic fillers are disclosed, for example, in U.S. Pat. No. 5,595,823 to Chen et al., which describes fuser rollers having a surface layer comprising fluorocarbon elastomer and aluminum oxide fillers. These fillers are not treated and are prone to high reactivity with the toner and charge control agents and this, too, is undesirable.

U.S. Pat. No. 5,017,432 to Eddy et al. describes a fluorocarbon elastomer fuser member which contains cupric oxide to interact with the polymeric release agent and provide an interfacial barrier layer.

U.S. Pat. No. 5,464,698 to Chen et al. describes fuser rollers having a surface layer comprising fluorocarbon elastomer and tin oxide fillers. The fillers provide active sites for reacting the mercapto-functional polydimethylsiloxane.

Fuser members of condensation-crosslinked PDMS elastomers filled with metal oxides are disclosed, for example, in U.S. Pat. No. 5,401,570 to Heeks et al. This patent describes a silicone rubber fuser member containing aluminum oxide fillers which react with a silicone hydride release oil.

U.S. Pat. No. 5,480,724 to Fitzgerald et al. discloses tin oxide fillers which decrease fatigue and creep (or compression) of the PDMS rubber during continuous high temperature and high stress (i.e. pressure) conditions.

Some metal oxide filled condensation-cured PDMS elastomers are also disclosed in U.S. Pat. No. 5,269,740 to Fitzgerald et al. (cupric oxide filler), U.S. Pat. No. 5,292,606 to Fitzgerald (zinc oxide filler), U.S. Pat. No. 5,292,562 to Fitzgerald et al. (chromium oxide filler), and U.S. Pat. No. 5,336,596 to Bronstein et al. (nickel oxide filler). All provide good results.

However, it is conventionally known in the art that fillers useful in one elastomer material may not be useful in a different elastomer due to chemical or other interactions that may differ substantially between material types. Different metal and non-metal oxides also may behave differently and be unsuitable for use in a fuser member.

U.S. Pat. No. 4,264,181 to Lentz et al. includes lead oxide as a suitable filler in various fluorocarbon elastomers (Viton E430, VitonE60C, Viton GH), yet U.S. Pat. No. 5,017,432 to Eddy et al. teaches that lead oxide is undesirable on the basis that it produces an unacceptable fuser member with similar fluorocarbon elastomers (Viton GF).

U.S. Pat. No. 4,515,884 to Field et al. discloses a fuser member which utilizes metal oxide filled polydimethylsiloxane. The metal oxides are iron and tabular alumina, while calcined alumina is described as being unsuitable for use.

U.S. Pat. No. 4,562,335 to Katsuno et al. discloses a silicon carbide filled condensation-cured PDMS elastomer providing good release.

U.S. Pat. No. 4,763,158 to Nitzsche describes boron nitride as a useful filler in polydimethylsiloxane elastomers; however the results it achieves indicate that in fluorocarbon elastomers it demonstrates poor release performance and is unsuitable for use.

U.S. Pat. No. 3,050,490 to Nitzsche et al. disclose the use of boron nitride fillers in silicone elastomers to control the degree of self-adhesion of the vulcanized silicone rubber. The compositions are described as being useful for applications for self-adhering silicone rubber such as electrical insulating, joint sealants, packing rings, laminating materials, etc.

U.S. Pat. No. 4,292,225 to Theodore et al. discloses a thick highly filled thermally conductive elastomer which comprises an organopolysiloxane with a viscosity modifier, silica and a thermally conductive boron refractory powder preferably boron nitride which aids thermal conductivity. These highly filled thermally conductive elastomers are described as being useful in ring gear assemblies.

Unfortunately, as fuser rollers wear, the fillers that are exposed react not only with the functionalized polymeric release agent, but also with the toner, paper substrate, and charge control agent. Such reactions build up debris on the surface of the fuser roller, causing deterioration of toner release and great reduction in the life of the fuser roller.

Thus, there remains a need for fuser members whose fillers have a low propensity to react with toners or are made to enhance the interaction between the elastomer and filler and also between the polymeric release agent and filler. In particular, there remains the need for a unique combination of fluoroelastomer, non-metal oxide and curative system which overcomes or at least minimizes the above deficiencies.

The present invention is directed to overcoming the problem encountered in the art.

SUMMARY OF THE INVENTION

The present invention relates to an electrophotographic system, which has a member with a surface layer and also may include a base layer. The surface layer is prepared from a surface layer composition, including a fluoroelastomer and a boron nitride filler coupled with a silane.

The present invention also relates to a thermally conductive fuser member with a surface layer over a base layer. The surface layer is prepared from a surface layer composition, including a fluoroelastomer and a boron nitride coupled with a silane.

The present invention provides an effective way to solve the problems described above. For example, by filling a fluorocarbon elastomer with boron nitride filler particles treated with a coupling agent, such as a silane, the present invention provides a fuser member with the desired thermal conductivity and may have improved wear properties.

An additional advantage is that the present invention allows for a high percentage of boron nitride fillers in the fluorocarbon elastomer and therefore high thermal conductivity can be achieved. In conjunction with high filler loadings, boron nitride has the added advantage of low density and reduced tendency for the filler to drop out during solvent coating.

DETAILED DESCRIPTION OF THE INVENTION

The present invention relates to an electrophotographic system, which has a member with a surface layer and also may include a base layer. The surface layer is prepared from a surface layer composition, including a fluoroelastomer and a boron nitride filler coupled with a silane.

The present invention also relates to thermally conductive fuser member with a surface layer(s), which may be over a base layer. The surface layer is prepared from a surface layer composition, including a fluoroelastomer and a boron nitride filler coupled with a silane.

The electrophotographic system of the present invention includes, but is not limited to, a fuser member, a transfix member, a receiver member, and a rheological member.

The fuser member of the present invention member may be a roll, belt, flat surface, or other suitable shape used in the fixing of thermoplastic toner images to a suitable substrate. Typically, the fuser member is made of a hollow cylindrical metal core, such as copper, aluminum, steel and like, and has an outer layer of the selected cured fluoroelastomer. In one aspect of the present invention, a fuser member has a heating element disposed with its center. In another aspect of the present invention the fuser roll includes a cylindrical core and a coating in accordance with the present invention, on the cylindrical core. In addition, an elastomeric base cushion can be applied to the core prior to the application of the coating or surface layer of the present invention. Base cushions are often silicone materials which may be of low thermal conductivity or high thermal conductivity. High thermal conductivity base cushions are typically used where heat is applied from within the fuser member core. In one aspect of the present invention, a suitable base member is a metallic cylindrical roll and the surface layer is from about 0.1 mm to about 2.5 mm thick.

Figure 1:
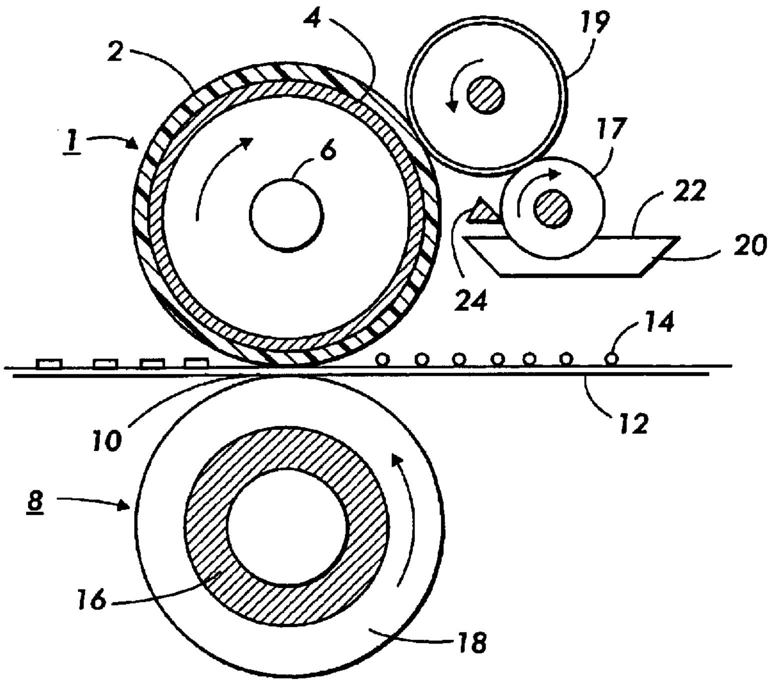
FIG. 1 is a cross-sectional view of a fuser system in accordance with the present invention.

FIG. 1 is a cross-sectional view of a fuser system in accordance with the present invention. Fuser roll 1 includes elastomer surface 2 upon suitable base member 4 which is a hollow cylinder or core. This cylinder or core is fabricated from any suitable metal such as aluminum, anodized aluminum, steel, nickel, copper, and the like, and includes heating element 6 disposed in the hollow portion thereof which is coextensive with the cylinder. Backup or pressure roll 8 cooperates with fuser roll 1 to form a nip or contact arc 10 through which a copy paper or other substrate 12 passes such that toner images 14 thereon contact elastomer surface layer 2 of fuser roll 1. As shown in FIG. 1, backup roll 8 has rigid hollow steel core 16 with soft surface layer 18 thereon. Sump 20 contains polymeric release agent 22 which may be a solid or liquid at room temperature, but is a fluid at operating temperatures.

Release agent delivery rolls 17 and 19, rotatably mounted in the direction indicated, are provided to transport release agent 22 from the sump 20 to elastomer surface 2. As illustrated in FIG. 1, roll 17 is partly immersed in sump 20 and transports on its surface release agent from the sump to the delivery roll 19. By using metering blade 24, a layer of polymeric release fluid can be applied initially to delivery roll 19 and subsequently to elastomer 2 in a controlled thickness ranging from submicron thickness to a thickness of several microns of release fluid. Thus, with metering device 24, about 0.1 to 2 microns or greater thicknesses of release fluid can be applied to elastomer surface 2.

Figure 2:
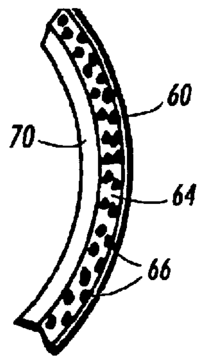
FIG. 2 is a fragmentary cross-sectional view of one embodiment of the fuser member of the present invention.

FIG. 2 shows a fragmentary cross-sectional view of part of the fuser member of the present invention magnified many times in order to show the thin layers of the fuser member surface. Elastomer 64 is deposited upon base member 70 by any suitable means such as spraying elastomer 64 containing non-metal oxide filler 66 directly upon base member 70. The particles of non-metal oxide filler coupled with silane, such as boron nitride fillers coupled with a silane shown in FIG. 2 are illustrated as having irregular shapes; however, any form of non-metal oxide filler may be used in elastomer 64, including powders, flakes, platelets, spheroids, fibers, ovoid particles, and the like. A film of polymeric release agent having functional groups is shown on the surface of elastomer 64 and is designated by numeral 60. Generally, where the fuser member is heated by internal means, the elastomer having metal oxide filler is preferably of a thickness sufficient to constitute a minimal thermal barrier to heat radiating from inside the fuser member to the outermost layer of elastomer. Recommended thicknesses are generally greater than 100 $\mu$m, but may be from 0.0025 cm to about 9 mm or at least a range from about 0.01 cm to about 0.25 cm. The preferred thickness depends upon the fuser member configuration and the particular backup or pressure member (hard or conformable) being used with the fuser member.

Figure 3:
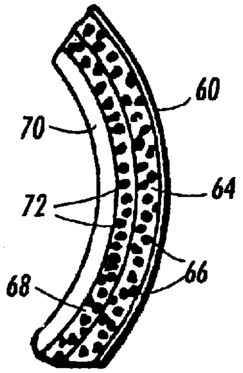
FIG. 3 is a fragmentary cross-sectional view of another embodiment of the fuser member of the present invention.

FIG. 3 shows a fragmentary cross-sectional view of an alternative embodiment of the fuser member of the present invention. Here, intermediate layer 68 is positioned between base member 70 and elastomer 64. As illustrated in FIG. 3, intermediate elastomer layer 68 maybe filled with metal oxide filler 72. The intermediate layer maybe deposited upon the base member 70 by any suitable method. The intermediate layers may be optionally used to promote strength and conformability or compressibility when used in conjunction with a backup or pressure roll.

Alternatively, there may be one or more thermally conductive intermediate layers between the substrate and the outer layer of the cured elastomer if desired. A fuser member of the present invention may also have an adhesion layer between the base member and the surface layer. For example, in some applications, it may be required that an adhesion layer be applied between the base cushion and the coating to improve the strength of the interface.

In alternative aspect of the present invention, the fuser member may further comprise a release layer around the surface layer. Examples of typical materials having the appropriate thermal and mechanical properties for such intermediate layers include thermally conductive (e.g., 0.2 watts/meter ° Kelvin to 0.8 watts/meter ° Kelvin) silicone elastomers such as high temperature vulcanizable ("HTV") materials and liquid silicone rubbers ("LSR"), which may include a non-metal or metal filler in the amounts described herein. The silicone elastomer may have a thickness of about 0.125 mm to 9 mm or more (radius). An HTV is either a plain polydimethyl siloxane ("PDMS"), with only methyl substituents on the chain, $(OSi(CH_3)_2)$ or a similar material with some vinyl groups on the chain $(OSi(CH{=}CH_2)(CH_3))$. Either material is peroxide cured to create crosslinking. An LSR usually consists of two types of PDMS chains, one with some vinyl substituents and the other with some hydride substituents. The two different PDMS types are kept separate as two separate components, where each component may contain different materials, such as catalysts. Upon mixing those two separate components just prior to molding, a catalyst contained in one component catalyzes a crosslinking reaction between the two chain types, which results in addition of the hydride group ($OSiH(CH_3)$) of one chain type with vinyl group substituents of the other chain type.

In accordance with the present invention, a fusing system including a fusing member is provided where the surface layer of the fusing member comprises an fluoroelastomer filled with an boron nitride filler coupled with a silane having an average particle size of from about 0.5 to about 15 microns present in an amount to provide a thermal conductivity of at least 0.24 watts/meter ° Kelvin in the surface layer, together with a hardness of from about 60 to about 90 and preferably about 82 Shore A, such that the a softer surface or base layer material is better for fusing of suitable materials to a suitable attachment point which is part of the present invention. Typically, the surface layer of the fuser member is from about 4 mils to about 9 mils, preferably 6 mils, in thickness as a balance between conformability and cost and to provide thickness manufacturing latitude.

One example of fluorocarbon elastomers used in the invention are those prepared according to the method described in U.S. Pat. No. 5,851,673, to Chen et al. which is hereby incorporated by reference in its entirety.

Other suitable fluoroelastomers include FFKM elastomers and hydrofluoroelastomers. Illustrative FFKM elastomers are perfluororubbers of the polymethylene type having all substituent groups on the polymer chain either fluoro, perfluoroalkyl, or perfluoroalkoxy groups. The hydrofluoroelastomers (also known as FKM elastomers), according to the present invention, are those defined in ASTM designation D1418-90 and are directed to fluororubbers of the polymethylene type having substituent fluoro and perfluoroalkyl or perfluoroalkoxy groups on a polymer chain.

Additional fluoroelastomers useful in the practice of the present invention are those described in detail in U.S. Pat. No. 4,257,699 to Lentz, U.S. Pat. No. 5,017,432 to Eddy et al., and U.S. Pat. No. 5,061,965 to Ferguson et al., which are hereby incorporated by reference in their entirety. As described therein, these fluoroelastomers, particularly from the class of copolymers, terpolymers, and tetrapolymers of vinylidenefluoride hexafluoropropylene, tetrafluoroethylene, and cure site monomer (believed to contain bromine) are known commercially under various designations as Viton A, Viton E60C, Viton E430, Viton 910, Viton GH, Viton GF and Viton F601C. The Viton designation is a Trademark of E. I. DuPont deNemours, Inc. Other commercially available materials include Fluorel 2170, Fluorel 2174, Fluorel 2176, Fluorel 2177 and Fluorel LVS 76, Fluorel being a Trademark of 3M Company. Additional commercially available materials include Aflas, a poly (propylene-tetrafluoroethylene) copolymer, Fluorel II a poly (propylene-tetrafluoroethylene-vinylidenefluoride) terpolymer both also available from 3M Company. Also, the Tecnoflons identified as FOR-60KIR, FOR-LHF, NM, FOR-THF, FOR-TFS, TH, TN505 are available from Ausimont Chemical Co. Typically, these fluoroelastomers can be cured with a nucleophilic addition curing system, such as a bisphenol crosslinking agent with an organophosphonium salt accelerator as described in further detail in the above referenced Lentz Patent, and in the Eddy et al. patent or with a peroxide as described in DuPont's literature in which case a cure site monomer such as bromomethyl perfluorovinyl ether is also necessary.

In one aspect of the present invention, a suitable embodiment of the hydrofluoroelastomer is that described in U.S. Pat. No. 5,017,432 to Eddy et al., which is hereby incorporated by reference and provides a fuser member surface layer comprising poly(vinylidenefluoride-hexafluoropropylene-tetrafluoroethylene-cure site monomer believed to contain bromine). The vinylidenefluoride is present in an amount less than 40 weight percent and which is cured from a dried solvent solution thereof with a nucleophilic curing agent soluble in the solvent solution and in the presence of less than 4 parts by weight inorganic base per 100 parts of polymer. The inorganic base is effective to at least partially dehydrofluorinate the vinylidenefluoride, which is described in greater detail in U.S. Pat. No. 5,017,432 to Eddy et al., which is hereby incorporated by reference in its entirety. The nucleophilic curing system is further described in greater detail in U.S. Pat. No. 4,272,179 to Seanor and U.S. Pat. No. 4,264,181 to Lentz et al., which are hereby incorporated by reference in their entirety.

In one aspect of the present invention, a suitable fluorocarbon elastomer for the outermost layer of the fuser member of the present invention is tetrafluoroethylene (TFE), FX-9038, available from 3M, containing 52 mole percent vinylidene fluoride (VF), 34 mole percent TFE, and 14 mole percent hexafluoropropylene (HFP). In another aspect, alternate suitable fluoroelastomer, FE-5840Q, also available from 3M, contains 53 mole percent VF, 26 mole percent TFE, and 21 mole percent HFP.

In another aspect of the fuser member of the present invention, the outermost layer uses of a fluorocarbon matrix formed from a cured fluorocarbon elastomer, preferably a terpolymer of VF, TFE, and HFP, that includes at least about 21 mole percent HFP and, preferably, at least about 50 mole percent VF. Among commercially available fluorocarbon elastomers, Viton™ materials, obtainable from DuPont, are frequently employed for the fabrication of fuser members. These materials include Viton™ A, containing 25 mole percent HFP; Viton™ E45, containing 23 mole percent HFP; and Viton™ GF, containing 34 mole percent HFP. Although it is not critical in the practice of the present invention, the number-average molecular weight range of the fluorocarbon copolymers may vary from a low of about 10,000 to a high of about 200,000. In the more preferred embodiments, the vinylidene fluoride-based fluorocarbon elastomers have a number-average molecular weight range of about 50,000 to about 100,000.

Nucleophilic addition cure systems used in the present invention are well known in the prior art. Suitable fluorocarbon-curing agents or crosslinking agents for use in the process of the present invention include the nucleophilic addition curing agents as disclosed, for example, in U.S. Pat. No. 4,272,179 to Seanor, which is hereby incorporated by reference in its entirety. An example of this cure system comprises a bisphenol crosslinking agent and an organophosphonium salt as accelerator. Suitable bisphenols include 2,2-bis(4-hydroxyphenyl) hexafluoropropane, 4,4-isopropylidenediphenol and the like. Although other conventional cure or crosslinking systems may be used to cure the fluorocarbon elastomers useful in the present invention, for example, free radical initiators, such as an organic peroxide, dicumyl peroxide and dichlorobenzoyl peroxide, or 2,5-dimethyl-2,5-di-t-butylperoxyhexane with triallyl cyanurate.

Nucleophilic addition-cure systems used in conjunction with fluorocarbon copolymers can generate hydrogen fluoride and thus acid acceptors are added as fillers. Suitable acid acceptors include metal oxides or hydroxides such as magnesium oxide, calcium hydroxide, zinc oxide and the like, which can be used as mixtures in various proportions, typically in the range of 5 to 40 parts per 100 parts of fluorocarbon polymer.

In one aspect of the present invention, a bisphenol curing method is used for its ease of processing by solution coating, which includes the use of peroxide, amine, amino silane or bisphenol A type chemicals. In particular, for a Bisphenol A cure, DuPont VC 50 is mixed approximately with 1 part of $Ca(OH)_2$ and 2 parts of MgO. Suitable accelerators for the bisphenol curing method include organophosphonium salts, also known as organophosphonium accelerators, e.g., halides such as benzyl triphenylphosphonium chloride, as disclosed in U.S. Pat. No. 4,272,179 to Gallusser et al., which is hereby incorporated by reference in its entirety.

The boron nitride filler particles are white crystals and have a hexagonal platey structure resembling that of graphite. They are not abrasive, but are temperature resistant and exhibit high thermal conductivity. They are commercially available in several grades and sizes. Typical suitable materials include those available from Sohio Engineering Materials Co. under the trademark designation Combat SHP-40 and SHP-325 which are high purity grades of boron nitride having different screen sizes. SHP-40 is the coarser of the two with 90% passing a 40 mesh screen and being retained on 150 mesh screen and SHP-325 having 90% of the particles pass through a 325 mesh screen. The boron nitride filler may range from 0.5 microns to 80 microns average particle size, or at least having a particle size from 1 to 20 microns. The amount of boron nitride employed in the elastomer composition can vary over a wide range up to about 100 parts of boron nitride per 100 parts of the elastomer at which point the addition of additional filler makes processing difficult. The minimum amount present in the elastomer composition should be that which will substantially increase the thermal conductivity of the elastomer while maintaining good release properties of the elastomeric surface. Typically from about 5 volume percent to about 35 volume percent of boron nitride for 100 parts by weight of elastomer may be used, or at least about 3 volume percent to 35 volume percent of the fluoroelastomer.

The best balance between increased thermal conductivity in a fuser roll application, while maintaining release characteristics, is obtained with between 20 parts of boron nitride and 40 parts by weight of boron nitride per 100 parts of elastomer. The boron nitride filler has a concentration of from about 5 percent to 55 percent of the total volume of the surface layer, or at least about 3 volume percent to 35 volume percent of the fluoroelastomer.

Boron nitride fillers can interact with fluorocarbon polymers and bond with them Such fillers also help to wet the surface and thereby facilitate compounding, while decreasing abrasion of the fuser member overcoat. The present invention provides an effective, durable fuser roller and high quality copies at high speed.

Moreover, other additives or agents may be incorporated in the elastomeric composition in accordance with the present invention such that the integrity of the elastomer is not effected. Such agents include cross-linking agents, catalysts, coloring agents, processing aids, accelerators, and polymerization initiators. The boron nitride filler, alone or in combination with additional low hardness fillers, may be dispersed in the elastomer material in any suitable or convenient form and manner. Such boron nitride filler is uniformly dispersed and useful in the elastomer during compounding. For example, when the elastomer is in the form of a gum, the boron nitride and other filler may be milled into the gum prior to curing to form the elastomer. In general, the boron nitride filler and any other filler are dispersed in the elastomer by mixing with the elastomer gum or other millable form of the elastomer compound prior to solution or homogenization before application to the base member. The boron nitride and any other filler present may be dispersed in the elastomer by conventional methods known to those skilled in the art. For example, in a pebble mill, the boron nitride and elastomer may be compounded during which the boron nitride may be reduced in particle size. The compounding, however, should not be carried out to such an extent that the boron nitride loses its general geometric shape.

The fuser members may then be prepared by applying the elastomer having the boron nitride and any other filler dispersed therein directly to the base member in one application or by successively applying layers of the elastomer composition to the base member. The coating is most conveniently carried out by spraying or dipping in a light solution or homogenous suspension containing the filler. Molding, extruding and wrapping are also alternative techniques which may be used to make the fuser members. Typically, the elastomeric surface layer is from about 0.1 mm to about 2.5 mm thick. When the desired thickness of elastomer composition is coated on the base member, the elastomer composition is cured and thereby fused to the base member.

In the one significant aspect of the present invention, the boron nitride filler has been surface treated with a silane coupling agent.

In one aspect of the present invention, suitable silane coupling has

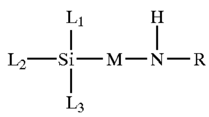

or

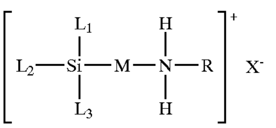

the general structure:

wherein

M=aliphatic or aromatic chain with C atom numbers varying from 0–20.

R=proton, phenyl or alkyl, etc.

$L_1$, $L_2$, $L_3$=Alkoxy, alkyl, halide, etc. with C atom numbers varying from 0–10 and at least one of the L should be alkoxy or halide.

X=negative counter ion, e.g. chloride ion, bromide ion, etc.

Suitable silane coupling agents are 3-aminopropyltrimethoxysilane, 3-aminopropyltriethoxysilane, N-phenylaminopropyltrimethoxysilane, (aminoethylaminomethyl) phenethyltrimethoxysilane, aminophenyltrimethoxysilane, 3-aminopropyldimethoxysilane, 3-aminopropylmethyldiethoxysilane, 3-(2-aminoethylamino)propyltrimethoxysilane, 3-(2-N-benzylaminoethylaminopropyl)trimethoxysilane hydrochloride and g-glycidoxypropyltrimethoxy, etc.

The filler may be treated with the silane coupling agent by reacting the filler with a dilute solution of the silane coupling agent. The solvent may be any solvent that does not interfere with the reaction of the coupling agent to the filler. Alcohol with a few percent of water added is a typical solvent system. Alternately, coatings may be formed from solutions of the fluoroelastomer compound. The solution may be formed by solvating conventionally mixed material in a compatible solvent, such as methylethylketone (MEK), methylisobutylketone (MIBK) or hexafluorbenzene. Alternately, the material may be mixed by adding the ingredients to a compatible solvent, such as MEK and/or MIBK or hexafluorobenzene, and solvating the fluoroelastomer in place with the ingredients of the formulation. In either case, the solvated fluoroelastomer can then be applied by methods of spray, dip, ring coat, curtain coat or flow coat. After desolvation, these coatings are cured and postcured.

The filler can also be treated by the silane coupling agent by combining the boron nitride filler directly with the silane coupling agent without solvent present. In another embodiment, the silane coupling agent may be added during the compounding of the fluorocarbon elastomer and the boron nitride carbide filler. In this way the filler treatment and the filler compounding with the fluorocarbon elastomer are accomplished in a single step. The filler(s) may be treated with the silane by addition to the bulk compound at the rate of 0.1% to several percent or the filler may be pretreated before adding to compound by one skilled in the art.

The boron nitride filler materials, including boron nitride coupled to silane, may be physically compounded by conventional mechanical mixing (e.g., roll mill, banbury or extruder). The coating may be then formed by molding, extruding, and/or wrapping the material at a time and temperature sufficient to cure the material (this is very dependent on the specific formulation and needs to be adjusted for each formulation.)

Suitable PDMS release agents, which include a functional group that is reactive with the fluorocarbon elastomer, have the formula

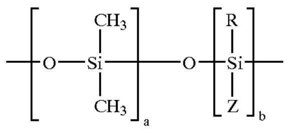

where R is alkyl or aryl containing up to about 8 carbon atoms, Z is selected from the group consisting of hydrogen, aminoalkyl containing up to about 8 carbon atoms, and mercaptoalkyl containing up to about 8 carbon atoms, and the ratio of a:b is about 1:1 to 3000:1. In an alterative aspect, Z is hydrogen, aminopropyl, or mercaptopropyl. In a particularly preferred embodiment, Z is hydrogen and the a:b ratio is about 10:1 to 200:1. In another alternative aspect, Z is aminopropyl and the a:b ratio is about 200:1 to 2,000:1.

An example of a hydrogen-functionalized PDMS release agent is EK/PS-124.5 (available from United Chemical), which contains 7.5 mole percent of the functionalized component and has a viscosity of 225 centistokes. Xerox amino-functionalized PDMS 8R3995 Fuser Agent II contains 0.055 mole percent of an aminopropyl-substituted component and has a viscosity of 300 centistokes. Xerox mercapto-functionalized PDMS 8R2955 contains 0.26 mole percent of a mercaptopropyl-substituted component and has a viscosity of 275 centistokes. A non-functionalized PDMS release oil, DC-200 (from Dow Corning), is useful for purposes of comparison with the functionalized agents and has a viscosity of 350 centistokes. Such functional and non-functional release agents may also be applied continuously during use of the fuser roll described in the present invention.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

Additionally, the recited order of processing elements or sequences, or the use of numbers, letters, or other designations therefor, is not intended to limit the claimed processes to any order except as may be specified in the claims.

What is claimed is:

1. An electrophotographic system, comprising a member which includes a surface layer(s), wherein the surface layer is prepared from a surface layer composition comprising:

a fluoroelastomer and a boron nitride filler coupled with a silane, wherein the silane is a g-glycidoxypropyltrimethoxysilane.

2. A thermally conductive fuser member comprising a surface layer, wherein the surface layer is prepared from a surface layer composition comprising:

a fluoroelastomer and a boron nitride filler coupled with a silane, wherein the silane is a g-glycidoxypropyltrimethoxysilane.

* * * * *